US010241520B2

(12) United States Patent
Sun et al.

(10) Patent No.: US 10,241,520 B2
(45) Date of Patent: Mar. 26, 2019

(54) SYSTEM AND METHOD FOR VISION-BASED FLIGHT SELF-STABILIZATION BY DEEP GATED RECURRENT Q-NETWORKS

(71) Applicant: TCL RESEARCH AMERICA INC., San Jose, CA (US)

(72) Inventors: Xinyao Sun, San Jose, CA (US); Xinpeng Liao, San Jose, CA (US); Xiaobo Ren, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 210 days.

(21) Appl. No.: 15/388,662

(22) Filed: Dec. 22, 2016

(65) Prior Publication Data

US 2018/0231985 A1    Aug. 16, 2018

(51) Int. Cl.
| | |
|---|---|
| *G05D 1/08* | (2006.01) |
| *G06T 7/73* | (2017.01) |
| *G06N 3/08* | (2006.01) |
| *G06N 7/00* | (2006.01) |
| *B64D 47/08* | (2006.01) |

(52) U.S. Cl.
CPC ........... *G05D 1/0816* (2013.01); *B64D 47/08* (2013.01); *G06N 3/084* (2013.01); *G06N 7/005* (2013.01); *G06T 7/74* (2017.01); *B64C 2201/141* (2013.01); *G06T 2207/10016* (2013.01); *G06T 2207/10032* (2013.01); *G06T 2207/20081* (2013.01); *G06T 2207/20084* (2013.01)

(58) Field of Classification Search
CPC ........ G05D 1/0816; G06T 7/74; G06N 3/084; G06N 7/005
USPC ............................................................. 701/4
See application file for complete search history.

(56) References Cited

U.S. PATENT DOCUMENTS

| | | | |
|---|---|---|---|
| 2016/0076892 A1* | 3/2016 | Zhou ................ | B64C 39/024 701/3 |
| 2017/0076438 A1* | 3/2017 | Kottenstette ....... | G06K 9/00637 |
| 2017/0193669 A1* | 7/2017 | Poddar .................. | G06T 7/2033 |
| 2018/0046187 A1* | 2/2018 | Martirosyan ........ | G05D 1/0094 |
| 2018/0053108 A1* | 2/2018 | Olabiyi ................ | G06N 7/005 |
| 2018/0150718 A1* | 5/2018 | Omari .................. | B64C 39/024 |
| 2018/0218618 A1* | 8/2018 | Rysdyk ................ | B64C 39/024 |

* cited by examiner

*Primary Examiner* — Yazan A Soofi
(74) *Attorney, Agent, or Firm* — Anova Law Group, PLLC

(57) ABSTRACT

A system and a method for vision-based self-stabilization by deep gated recurrent Q-networks (DGRQNs) for unmanned arial vehicles (UAVs) are provided. The method comprises receiving a plurality of raw images captured by a camera installed on a UAV; receiving an initial reference image for stabilization and obtaining an initial camera pose from the initial reference image; extracting a fundamental matrix between consecutive images and estimating a current camera pose relative to the initial camera pose, wherein the camera pose includes an orientation and a location of the camera; based on the estimated current camera pose, predicting an action to counteract a lateral disturbance of the UAV based on the DGRQNs; and based on the predicted action to counteract the lateral disturbance of the UAV, driving the UAV back to the initial camera pose.

17 Claims, 7 Drawing Sheets

SYSTEM AND METHOD FOR VISION-BASED FLIGHT SELF-STABILIZATION BY DEEP GATED RECURRENT Q-NETWORKS

FIELD OF THE INVENTION

The present invention relates generally to the field of computer technologies and, more particularly, to a system and a method for vision-based flight self-stabilization by deep gated recurrent Q-networks (DGRQNs).

BACKGROUND

Flight dynamics (dynamic flight stability and control) is of great importance in the study of mobile platforms, such as Unmanned Aerial Vehicles (UAVs) or drones. UAVs often desires a highly robust positioning system, because random errors in the position estimation would generate incoherent control actions, which lead to UAV crash and the loss of valuable hardware. Currently, most drones utilize GPS to obtain their positions. However, the GPS accuracy directly depends on the number of satellites adopted to estimate the position. Such a number may be substantially insufficient in an urban environment, especially an indoor environment.

In addition, conventional methods for lateral stabilization control reply on computational fluid dynamics by feeding back state variables (i.e., lateral translation velocity, yaw rate, roll rate and roll angle) which can be measured by the sensory system of the drones. However, the measurement accuracy is still below the requirements for an indoor environment application.

The disclosed system and method are directed to solve one or more problems set forth above and other problems.

BRIEF SUMMARY OF THE DISCLOSURE

One aspect of the present disclosure provides a method for vision-based self-stabilization by deep gated recurrent Q-networks (DGRQNs) for unmanned aerial vehicles (UAVs). The method comprises receiving a plurality of raw images captured by a camera installed on a UAV; receiving an initial reference image for stabilization and obtaining an initial camera pose from the initial reference image; extracting a fundamental matrix between consecutive images and estimating a current camera pose relative to the initial camera pose, wherein the camera pose includes an orientation and a location of the camera; based on the estimated current camera pose, predicting an action to counteract a lateral disturbance of the UAV based on the DGRQNs; and based on the predicted action to counteract the lateral disturbance of the UAV, driving the UAV back to the initial camera pose.

Another aspect of the present disclosure a non-transitory computer-readable medium having computer program for, when being executed by a processor, performing method for vision-based self-stabilization by deep gated recurrent Q-networks (DGRQNs) for unmanned aerial vehicles (UAVs), the method comprising: receiving a plurality of raw images captured by a camera installed on a UAV; receiving an initial reference image for stabilization and obtaining an initial camera pose from the initial reference image; extracting a fundamental matrix between consecutive images and estimating a current camera pose relative to the initial camera pose, wherein the camera pose includes an orientation and a location of the camera; based on the estimated current camera pose, predicting an action to counteract a lateral disturbance of the UAV based on the DGRQNs; and based on the predicted action to counteract the lateral disturbance of the UAV, driving the UAV back to the initial camera pose.

Another aspect of the present disclosure includes a system for vision-based self-stabilization by deep gated recurrent Q-networks (DGRQNs) for unmanned aerial vehicles (UAVs). The system comprises a camera pose estimation (CPE) module and a deep gated recurrent Q-networks (DGRQNs) engine module. The CPE module is configured to receive a plurality of raw images captured by a camera installed on the UAV, extract a fundamental matrix between consecutive images, and estimate a current camera pose relative to an initial camera pose, wherein the camera pose includes an orientation and a location of the camera. The DGRQNs engine module configured to, based on the estimated current camera pose, predict an action to counteract a lateral disturbance of the UAV based on DGRQNs, and based on the predicted action to counteract the lateral disturbance of the UAV, driving the UAV back to the initial camera pose.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
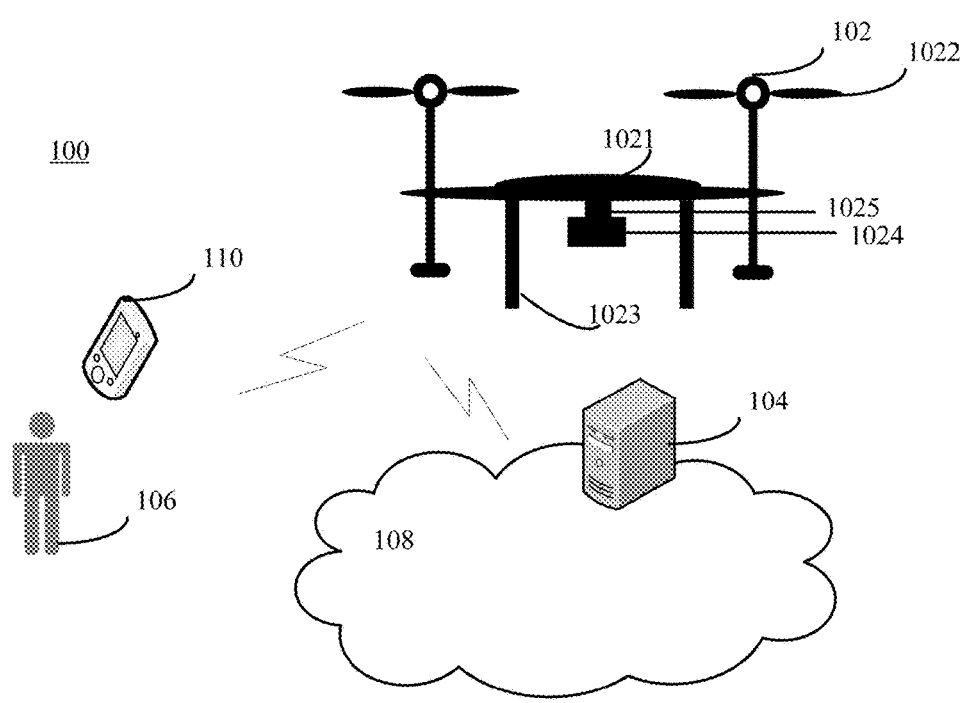
FIG. 1 illustrates an exemplary environment incorporating certain embodiments of the present invention.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Given the unavailability and inaccuracy of GPS and the sensory system, the present disclosure provides a system and a method for vision-based self-stabilization by deep gated recurrent Q-networks for UAVs. The disclosed system may be an intelligent self-positioning control system for drones, which is solely based on the visual information captured from the on-board monocular camera in an indoor environment. The self-stabilization in hovering state of the drone may be improved, and an inherent stability of the drone given an initial reference camera view prior to any motion planning may be realized. Without such a capability of counteracting lateral disturbance motion, the drone may easily drift away from the predesigned position and, thus, may interfere the subsequent vision-based navigation.

In the disclosed embodiments, the vision-based flight self-stabilization problem may be formulated as a visual scene-matching problem once the drone enters the hovering state. Given an initial reference camera view, the self-stabilization may be achieved through estimating the camera motions relative to the initial reference camera view from multiple views captured so far, and counteracting the camera motions by driving the drone back to its starting point.

The criteria for determining whether the drone has been stabilized or not may depend on the quality of scene-matching with the original view. The main challenge of such a large amount of uncertainty may be involved in the process of estimating and counteracting the camera motions, e.g., the accuracy of camera motion estimation, and the precise control of the drone, etc. Under a large and highly dynamic environment, an approach to infer an optimal behavior of the drone by interacting and analyzing feedback in an unknown environment is highly desired.

Further, in the disclosed embodiments, based on a reinforcement learning paradigm, the drone may be able to learn an optimal control behavior to achieve self-stabilization by exploration. In particularly, the difference between the initial camera pose and the poses estimated by multiple views captured so far may be integrated into the reinforcement learning paradigm within a Deep-Q learning framework. The intuition behind is that the drone motions caused by lateral disturbance and the control actions for the drone may play two counteracting opponents. By rewarding the scene-matching with higher quality and penalizing that with lower quality, the drone able to gradually learn the optimal control behavior to achieve self-stabilization.

FIG. 1 illustrates an exemplary environment 100 incorporating certain embodiments of the present invention. As shown in FIG. 1, the environment 100 may include a mobile platform 102, a server 104, a user 106, and a network 108. Other devices may also be included. The mobile platform 102 may include any appropriate mobile platforms, such as bicycles, automobiles, trucks, ships, boats, trains, helicopters, aircraft, and various hybrids thereof, etc.

The mobile platform 102 may respond commands from the user 106, through the network 108. The user 106 may use a remote controller 110 to control the mobile platform 102. The remote controller 110 may be not connected to the mobile platform 102 and may communicate with the mobile platform 102 wirelessly from a distance. The mobile platform 102 may be capable of following a set of predetermined instructions. In certain embodiments, the mobile platform 102 may operate semi-autonomously by responding to one or more commands from the user 106 while otherwise operating autonomously.

In one embodiment, the mobile platform 102 may be an unmanned aerial vehicle (UAV) or a drone 102. Various types of drones 102 may be suitable for use with the disclosed systems and methods. For example, the drone 102 may be an aerial rotorcraft that is propelled by multiple rotors. As shown in FIG. 1, the drone 102 may comprise a fuselage 1021, a plurality of rotors 1022, and one or more landing gears 1023. Other appropriate components may also be included.

The fuselage 1021 may comprise a control unit, an inertial measuring unit (IMU), processor, battery, power source, and/or other sensors. The rotors 1022 may connect to the fuselage 1021 via one or more arms or extensions that may branch from edges or a central portion of the fuselage 1021, and the one or more arms may have rotors 1022 at or near the ends of the arms. The rotors 1022 may be capable of rotating to generate lift for the drone 102, and may be propulsion units that may enable the drone 102 to move about freely through the air. The landing gears 1023 may support the weight of the drone 102, and provide rolling chassis/taxiing and shock absorption function.

Further, one or more image sensors 1024 may be mounted on the drone 102. The image sensor 1024 may be an image sensor based on various mechanism, such as an ultrasound detector, a radar, a monocular camera, and a binocular camera, etc. The image sensors 1024 may be directly mounted on the fuselage 1021 of the drone 102. In certain embodiments, the drone 102 may also include a gimbal mechanism 1025 disposed on a surface of the fuselage 1021 of the drone 102. The image sensor 1024 may be attached to the gimbal mechanism 1025, providing the image sensor 1024 rotational freedom about one or more axes with respect to the fuselage 1021.

The server 104 may include any appropriate type of server computer or a plurality of server computers for providing personalized contents to the user 106. For example, the server 104 may be a cloud computing server. The server 104 may also facilitate the communication, data storage, and data processing between the other servers and the mobile platform 102. The mobile platform 102, and server 104 may communicate with each other through one or more communication networks 108, such as cable network, wireless network, and/or satellite network, etc.

Figure 2:
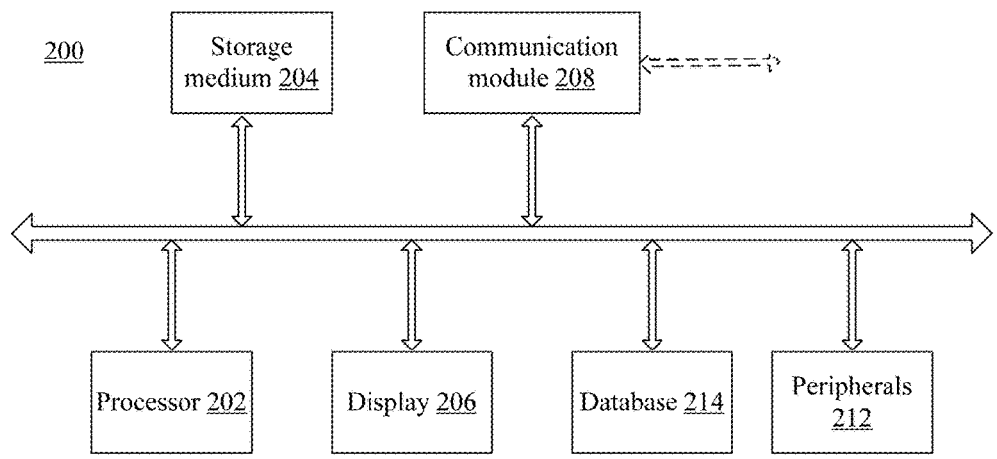
FIG. 2 illustrates an exemplary computing system consistent with disclosed embodiments.

The mobile platform 102, and/or server 104 may be implemented on any appropriate computing circuitry platform. FIG. 2 shows a block diagram of an exemplary computing system capable of implementing the mobile platform 102, and/or server 104.

As shown in FIG. 2, the computing system 200 may include a processor 202, a storage medium 204, a display 206, a communication module 208, a database 214, and peripherals 212. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Figure 3:
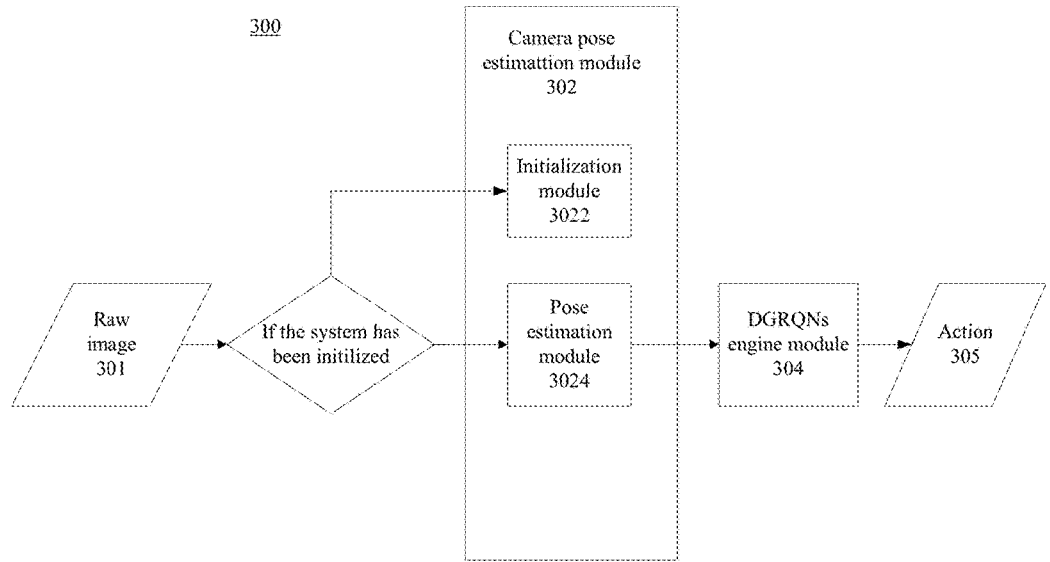
FIG. 3 illustrates a block diagram of an exemplary system for vision-based self-stabilization by deep gated recurrent Q-networks (DGRQNs) for UAVs consistent with disclosed embodiments.

Returning to FIG. 1, the mobile platform 102 may be implemented with a system for vision-based flight self-stabilization by deep gated recurrent Q-networks. FIG. 3 illustrates an exemplary system for vision-based self-stabilization by deep gated recurrent Q-networks (DGRQNs) for UAVs consistent with disclosed embodiments. As shown in FIG. 3, the system 300 for vision-based self-stabilization by DGRQNs for UAVs may include a camera pose estimation (CPE) module 302 and a deep gated recurrent Q-networks (DGRQNs) engine module 304. The CPE module 302 may further include an initialization module 3022 and a pose estimation module 3024.

The CPE module 302 may be configured to receive a plurality of raw images or raw views 301, extract a fundamental matrix between consecutive views, and estimate a current camera pose relative to an initial camera pose. In particular, the initialization module 3022 may be configured to receive a reference image (i.e., I_ref) for stabilization and obtain an initial camera pose from the initial reference image. The pose estimation module 3024 may be configured to extract a fundamental matrix between consecutive views, and estimate a current camera pose relative to an initial camera pose.

In one embodiment, the pose estimation module 3024 may be configured to estimate the current camera pose relative to the initial camera pose from two consecutive views. In another embodiment, the pose estimation module 3024 may be configured to estimate the current camera pose relative to the initial camera pose from multiple (more than two) consecutive views.

It should be noted that, the pose estimation module 3024 may be configured to estimate the current camera pose only after an initialization, i.e., the reference image (i.e., I_ref) for stabilization has been received by the initialization module 3022. Such an initialization may facilitate the scene-matching between the initial reference image and the subsequent images.

The DGRQNs engine module 304 may include a reinforcement learning engine, which may be implemented with an ultimate Neural Network powered by a mode-free reinforcement learning technique Q-learning. The DGRQNs engine module 304 may be configured to encode the estimated camera pose as the input, predict a desired action 305 to counteract the lateral disturbance of the drone, and drive the drone back to its initial position. The involvement of reinforcement learning may alleviate the burden of explicitly specifying the circumstances upon which the drone actions have been planned.

Figure 4:
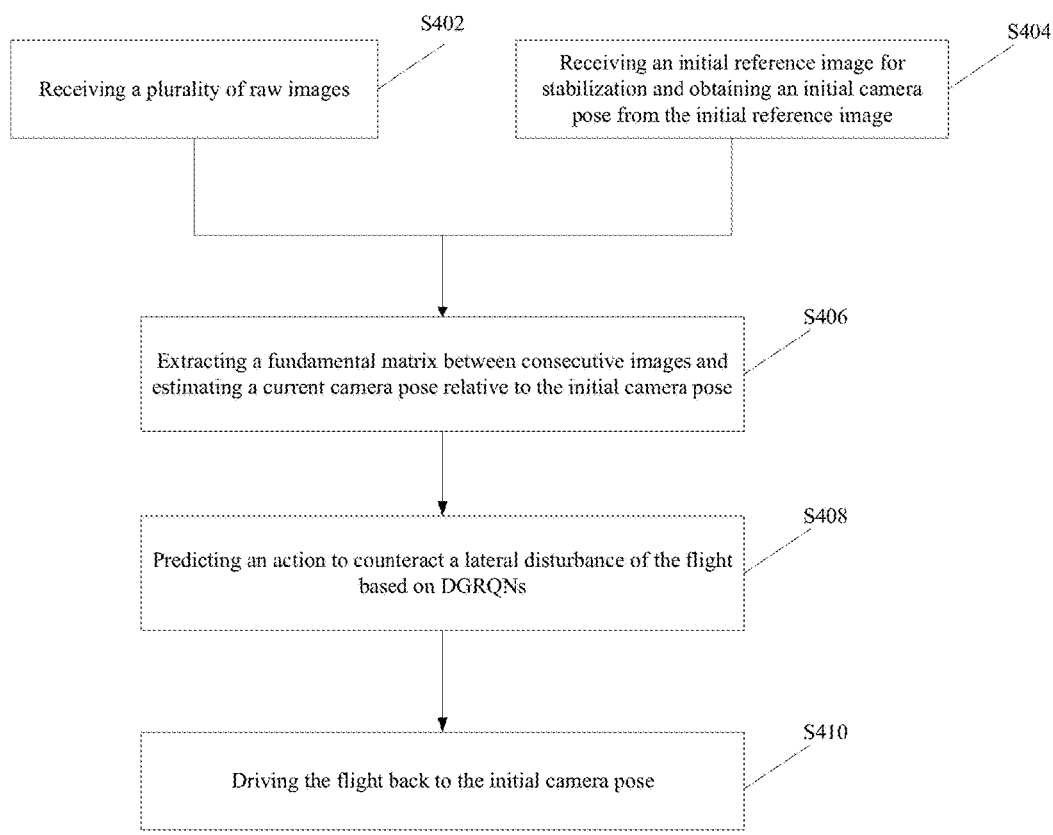
FIG. 4 illustrates a flow chart of an exemplary method for vision-based self-stabilization by DGRQNs for UAVs consistent with disclosed embodiments.

In certain embodiments, the system 300 for vision-based flight self-stabilization by DGRQNs for UAVs may also include a Q-networks training module configured to train the Q-networks. The detail functions of the initialization module, the CPE module, the DGRQNs engine module, and the Q-networks training module will be further illustrated in the description of the method for vision-based self-stabilization by deep gated recurrent Q-networks (DGRQNs) for UAVs. FIG. 4 illustrates a flow chart of an exemplary method for vision-based self-stabilization by deep gated recurrent Q-networks (DGRQNs) for UAVs consistent with disclosed embodiments.

As shown in FIG. 4, at the beginning, a plurality of raw images or raw views are received (S402). In particular, the raw image may be received through various approaches, such as ultrasound, vision-based, time-of-flight (TOF), and radar, etc. In the disclosed embodiments, the raw input image may be received through a monocular camera mounted on the drone. Meanwhile, an initial reference image (i.e., I_ref) for stabilization is received and an initial camera pose is obtained from the initial reference image (S404).

After the initial reference image (i.e., I_ref) for stabilization is obtained, a fundamental matrix between consecutive views is extracted and a current camera pose relative to the initial camera pose is estimated (S406).

In one embodiment, the fundamental matrix between consecutive views may be extracted from two consecutive views, and the current camera pose relative to an initial camera pose obtained in the initial reference image may be estimated from two consecutive views. In particular, image points are represented by homogenous 3-vectors q and q' in a first view and a second view, respectively. World points are represented by homogenous 4-vectors Q. A perspective view is represented by a 3×4 camera matrix P indicating the image projection q~PQ, where ~ denotes equality up to scale. A view with a finite projection center may be factored into P=K[R|T], where K is a 3×3 upper triangular calibration matrix holding the intrinsic parameters and R is a rotation matrix. The camera matrices for the first view and the second view are $K_1[1|0]$ and $K_2[R|T]$, respectively. $[T]_x$ is the skew symmetric matrix, and is expressed as:

$$[T]_X = \begin{bmatrix} 0 & -t_3 & t_2 \\ t_3 & 0 & -t_1 \\ -t_2 & t_1 & 0 \end{bmatrix}, \quad (1)$$

thus $[T]_x x = T \times x$ for all x. Then the fundamental matrix between the first view and the second view is expressed as $$F = K_2^{-T}[T]_x R K_1^{-1} \quad (2)$$

The fundamental matrix may encode the coplanarity, or epipolar constraint as in the following Eq. (3):

$$q'^T F q = 0 \quad (3)$$

The fundamental matrix between the first view and the second view may be considered without knowledge of calibration matrices. Moreover, the fundamental matrix may continue to exist when the projection centers are not finite. If $K_1$ and $K_2$ are known, the cameras may be considered to have be calibrated. In the disclosed embodiments, the image points q and q' may be considered to have been pre-multiplied by $K_1^{-1}$ and $K_2^{-1}$, respectively, and the epipolar constraint can be simplified as $$q'^T E q = 0, \quad (4)$$

where the matrix $E = [T]_x R$ is the essential matrix.

Depending on whether the cameras have been calibrated or not, either an 8-point algorithm for solving F or a 5-point algorithm for solving E may be used. For example, given the essential matrix E, R and t may be recovered through using Singular value decomposition (SVD), i.e., $E = U\Sigma V^T$. Let $$W = \begin{bmatrix} 0 & -1 & 0 \\ 1 & 0 & 0 \\ 0 & 0 & 1 \end{bmatrix}, \quad (5)$$

four solutions for E=[R|t] with two possible solutions of R (i.e., $R_1$ and $R_2$) and two possible solutions of T (i.e., $T_1$ and $T_2$) are shown in the following E. (6):

$$R_1=UWV^T, R_2=UW^TV^T, T_1=U_3, T_2=-U_3 \qquad (6)$$

To choose a true configuration, the determinant of R may be calculated first, and a valid solution may require det(R)=1 because det(R)=−1 may indicate that R is reflection. Then the 3D point may be computed using triangulation, and a valid solution may have a positive Z value.

In another embodiment, the fundamental matrix between consecutive views is extracted from multiple (more than two) consecutive views, and the current camera pose relative to an initial camera pose obtained in the initial reference image may be estimated from multiple (more than two) consecutive views. Obtaining the structure from motion with multiple views may be considered as a process of estimating the 3-D structure from a set of 2-D views. In the disclosed embodiments, the process of estimating the 3-D structure from a set of 2-D views may be considered as the process of estimating the poses of a calibrated camera from a sequence of views as the drone flies, and simultaneously reconstructing the 3-D structure of the scene up to an unknown scale factor.

Figure 5:
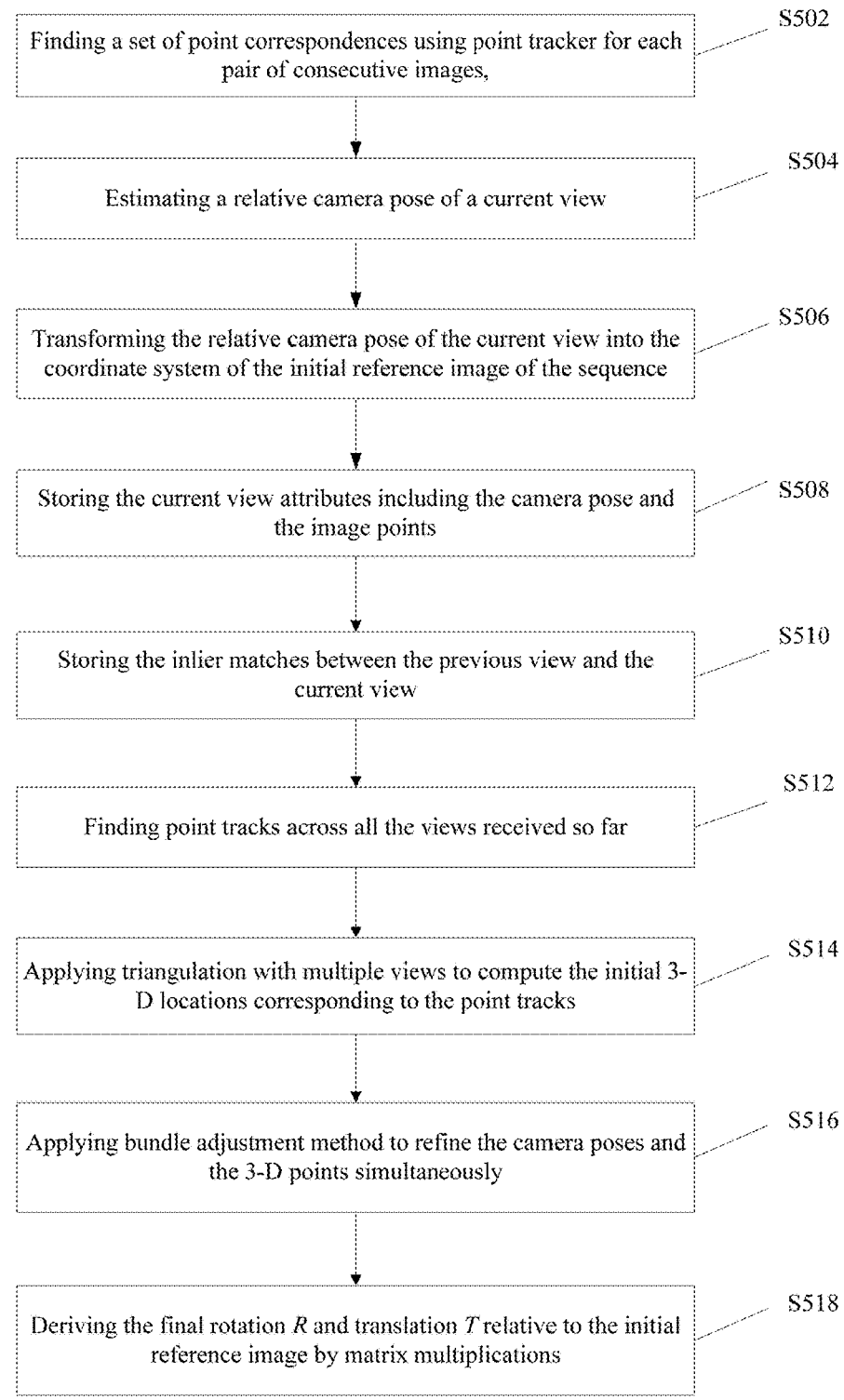
FIG. 5 illustrates a flow chart of an exemplary method for estimating a current camera pose relative to an initial camera pose from multiple consecutive views consistent with disclosed embodiments.

FIG. 5 illustrates a flow chart of an exemplary method for estimating a current camera pose relative to an initial camera pose from multiple consecutive views consistent with disclosed embodiments. As shown in FIG. 5, extracting the fundamental matrix between consecutive views from multiple (more than two) consecutive views, and estimating the current camera pose relative to the initial camera pose from multiple (more than two) consecutive views may include the following steps:

Step S502: for each pair of consecutive images, finding a set of point correspondences using point tracker;

Step S504: estimating a relative camera pose of a current view, wherein the relative camera pose of the current view includes a camera orientation and location of the current view with respect to a previous view;

Step S506: transforming the relative camera pose of the current view into the coordinate system of the first view I_ref (i.e., the initial reference image) of the sequence;

Step S508: storing the current view attributes including the camera pose and the image points;

Step S510: storing the inlier matches between the previous view and the current view;

Step S512: finding point tracks across all the views received so far, given I_ref;

Step S514: applying triangulation with multiple views to compute the initial 3-D locations corresponding to the point tracks;

Step S516: applying bundle adjustment method to refine the camera poses and the 3-D points simultaneously; and Step S518: given all the views so far, deriving the final rotation R and translation T relative to the first view I_ref by matrix multiplications. In particular, the rotation R and translation T in the matrix at each timestamp t may be stored as $H_t$ in the following Eq. (7):

$$H_t = \begin{bmatrix} R & T \\ 0 & 1 \end{bmatrix}, \qquad (7)$$

Returning to FIG. 4, after the current camera pose relative to an initial camera pose obtained from the initial reference image (i.e., I_ref) is estimated, a desired action to counteract the lateral disturbance of the UAV is predicted based on deep gated recurrent Q-networks (DGRQNs) (S408).

Deep Q-Networks (DQNs) have shown their capability of learning human-level control policies on the games. However, the classical DQNs may be trained only using the last few system states as the input, which may limit the performance of the model for tasks which require a long-term memory. In the disclosed embodiments, to prevent the drone from drifting, the sequence's information is of great importance to prevent the drone from drifting. On the other hand, Recurrent Neural Networks (RNNs) are powerful on learning in sequential processing tasks. The DGRQNs may be configured to combine the Gated RNNs and simplified Deep Q-Network.

Figure 6:
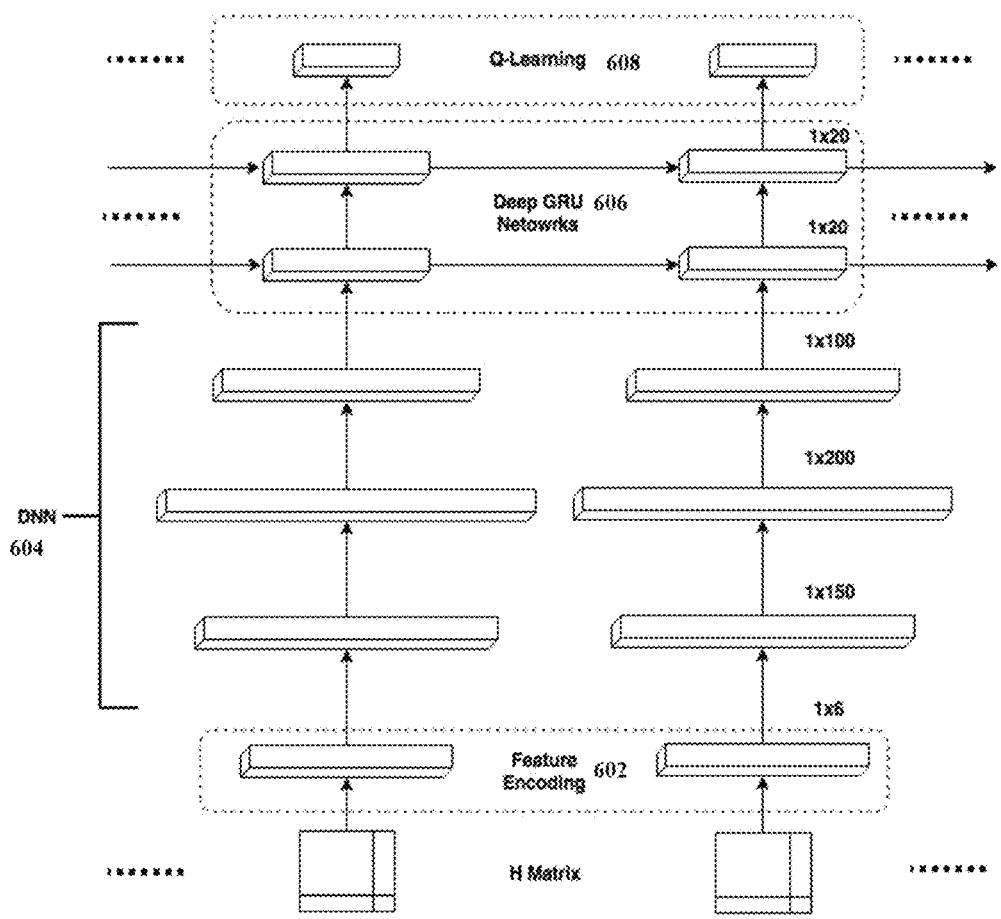
FIG. 6 illustrates an exemplary DGRQNs consistent with disclosed embodiments.
Figure 7:
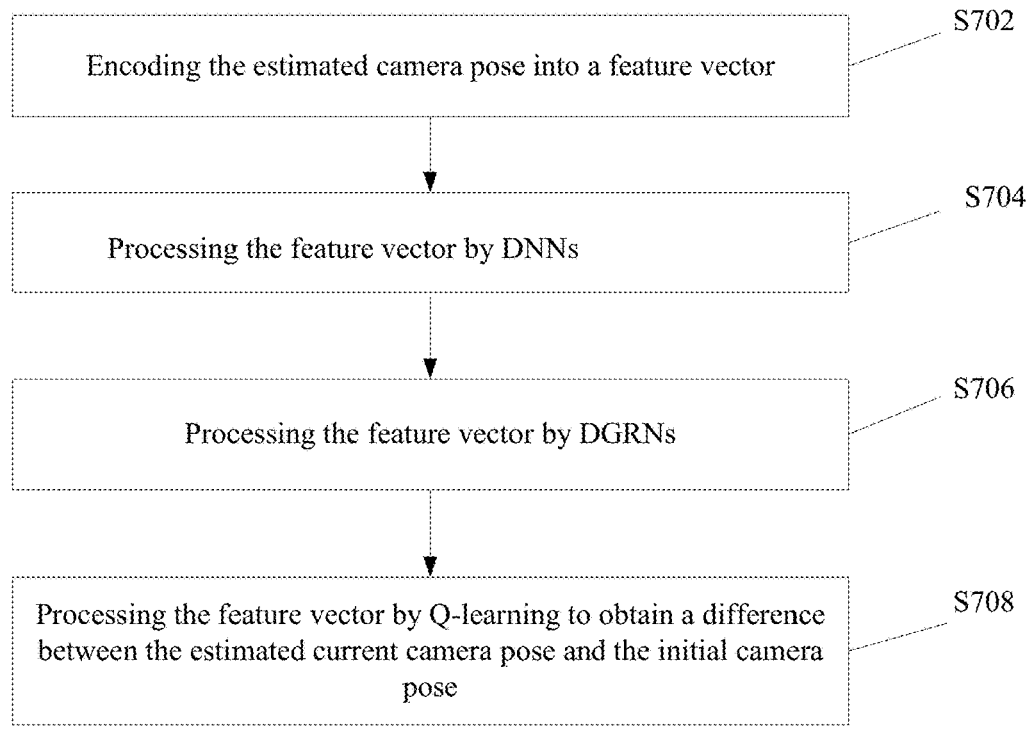
FIG. 7 illustrates a flow chart of an exemplary method for predicting an action to counteract the lateral disturbance of the UAV based on DGRQNs consistent with disclosed embodiments.

FIG. 6 illustrates an exemplary Deep Gated Recurrent Q-Networks (DGRQNs) consistent with disclosed embodiments. As shown in FIG. 6, the DGRQNs may involve feature encoding 602, deep neural networks (DNNs) 604, deep gated recurrent neural networks (DGRNs) 606, and Q-leaning 608. FIG. 7 illustrates a flow chart of an exemplary method for predicting a desired action to counteract the lateral disturbance of the drone based on deep gated recurrent Q-networks (DGRQNs) consistent with disclosed embodiments.

As shown in FIG. 7, at the beginning, the estimated camera pose is encoded into a feature vector, which is used as the input of the DGRQNs (S702). In particular, as shown in FIG. 6, the raw input of the DGRQNs may be a 4×4 matrix $H_t$ at each timestamp t. Then $H_t$ may be encoded to a length of 6 feature vector v ($\theta_{roll}$, $\theta_{pitch}$, $\theta_{yaw}$, $T_x$, $T_y$, $T_z$), according to the following Eq. (8):

$$H_t = \begin{bmatrix} h_{11} & h_{12} & h_{13} & h_{14} \\ h_{21} & h_{22} & h_{23} & h_{24} \\ h_{31} & h_{32} & h_{33} & h_{34} \\ 0 & 0 & 0 & 1 \end{bmatrix}, \qquad (8)$$

where $\theta_{roll}$ denotes a roll angle of orientation, and $\theta_{roll}$=a tan 2($h_{32},h_{33}$); $\theta_{pitch}$ denotes a pitch angle of orientation, and $\theta_{pitch}$=a tan 2 ($-h_{31},\sqrt{h_{32}^2+h_{33}^2}$); $\theta_{ywa}$ denotes a yaw angle of orientation, and $\theta_{yaw}$=a tan 2($h_{21}$ $h_{11}$); $T_x$ denotes translation on x axis, and $T_x$=$h_{14}$; $T_y$ denotes translation on y axis, and $T_y$=$h_{24}$; and $T_z$ denotes translation on z axis, and $T_z$=$h_{34}$. The encoded feature vector v ($\theta_{roll}$, $\theta_{pi}$, $\theta_{yaw}$, $T_x$, $T_y$, $T_z$) may present the drone's current state due to the changing between the estimated drone's current pose and the drone's initial pose.

Returning to FIG. 7, after the estimated camera pose is encoded to be a feature vector, the feature vector is processed by a deep neuron networks (DNNs) (S704). In particular, as shown in FIG. 6, the feature vector may be passed to a three-hidden-layer DNNs 604, and the corresponding number of hidden units may be 150, 200 and 100. All the units may be followed by leaky rectified linear units (LReLUs). The outputs of the DNNs 604 may be fed to the DGRNs 606.

Returning to FIG. 7, after the feature vector is processed by the DNNs, the feature vector is processed by deep gated recurrent neural networks (DGRNs) (S706). Drone's movement may be considered as a sequence of pose changing over time and, thus, it may be highly desired to perform an action based on the drone's previous states. In the disclosed embodiments, a two-layer DGRNs which is a variation on the LSTM RNNs may be adopted. The two-layer DGRNs may combine classical LSTM unit's forget and input gates into a single "update gate".

Figure 8:
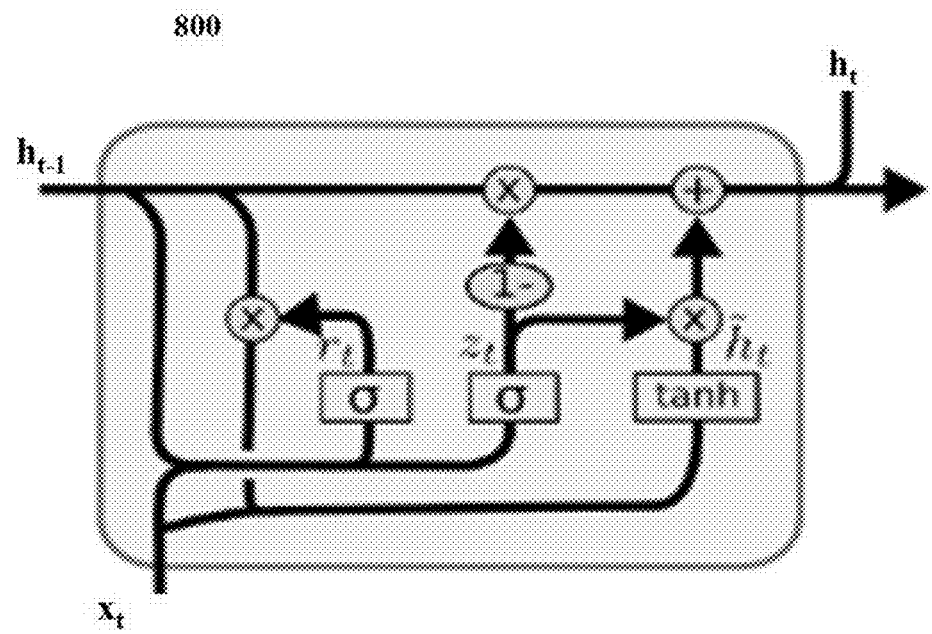
FIG. 8 illustrates an exemplary single gated recurrent unit (GRU) consistent with disclosed embodiments.

FIG. 8 illustrates an exemplary single gated recurrent unit (GRU) 800 consistent with disclosed embodiments. As shown in FIG. 8, the signal GRU 800 may have $x_t$ and the output $h_{t-1}$ of the last step's unit as the input. Meanwhile $h_t$ denotes the output of the GRU 800, and $h_t$ may be fed into the next RNN layer and the next step's GRU. The disclosed DGRQN may have a two-layer gated recurrent neural network (GRN), which may adopt the previous DNN's output as input. GRN's output may be formed as a vector of each candidate actions' Q-values.

The computation performed by each GRU 800 are expressed by the following equations:

$$z_t = \sigma(W_z \cdot [h_{t-1}, x_t]) \quad (9)$$

$$r_t = \sigma(W_r \cdot [h_{t-1}, x_t]) \quad (10)$$

$$\tilde{h}_t = \tan h(W \cdot [h_{t-1} * r_t, x_t]) \quad (11)$$

$$h_t = (1 - z_t) * h_{t-1} + x_t * \tilde{h}_t \quad (12)$$

Returning to FIG. 7, after the feature vector is processed by the DGRNs, the feature vector is processed by Q-learning to obtain a difference between the estimated current camera pose and the initial camera pose (S708). In particular, the reinforcement learning may allow machine to learn an optimal behavior as an agent by interacting and receiving feedback from the stochastic environment. The classical model of reinforcement learning may have a formalized environment as a Markov decision Process (MDP) and may be described by a 4-tuple (S, A, P, R) representation. At each timestamp t, a system observes state $s_t \in S$, and perform an action $a_t \in A$ that results the reward $r_t \sim R(s_t, a_t)$ and next state $s_{t+1} \sim P(s_t, a_t)$.

Q-Learning is a policy to estimates the max final reward value of performing an action under a given state. Q-Learning defines a Q-function $Q(s_t, a_t)$ as the best final rewards in which the system may perform $a_t$ at the state $s_t$. Then according to the next state's Q-value, the current state Q-value may be obtained through the following Eq. (13):

$$Q(s_t, a_t) = r + \max_{a_{t+1}} Q(s_{t+1}, a_{t+1}), \quad (13)$$

where r denotes the instance reward at current state. In the disclosed embodiments, the reward may be calculated by Eq. (14), $$r = -\|H_t - I\| = _{Frobenius\ norm} = \sqrt{\Sigma_{i,j}(H_t - I)_{i,j}^2}, \quad (14)$$

where I denotes a 4×4 identity matrix. The value of r may reveal the differences between the estimated current camera pose and the initial camera pose.

With an optimized Q-function, the agent may only have to perform the action with highest Q-value at each state. The Deep Q-Networks framework may overcome the challenging in the traditional Q-Learning, for example, a large number of unique states in the real task may make the learning untrainable. The disclosed method may estimate the Q-value online by querying the output from a network. The final output layer of the ultimate network may have a length of 8 to present the Q-value of 8 different actions (positive and negative movements on all gaz, roll, pitch, and yaw). The active function may be a linear regression because the Q-value may be any real number. In the disclosed embodiments, the encoded feature vector $v_t$ presents the state $s_t$.

In certain embodiments, the method for vision-based self-stabilization by deep gated recurrent Q-networks for UAVs may also include training the Q-network to obtain an ultimate network. The squared error loss function Eq. (15) may be adopted in the training:

$$L = \frac{1}{2}[\underbrace{(r + \max_{a_{t+1}} Q(s_{t+1}, a_{t+1}))}_{target} - \underbrace{Q(s_t, a_t)}_{predication}]^2 \quad (15)$$

Figure 9:
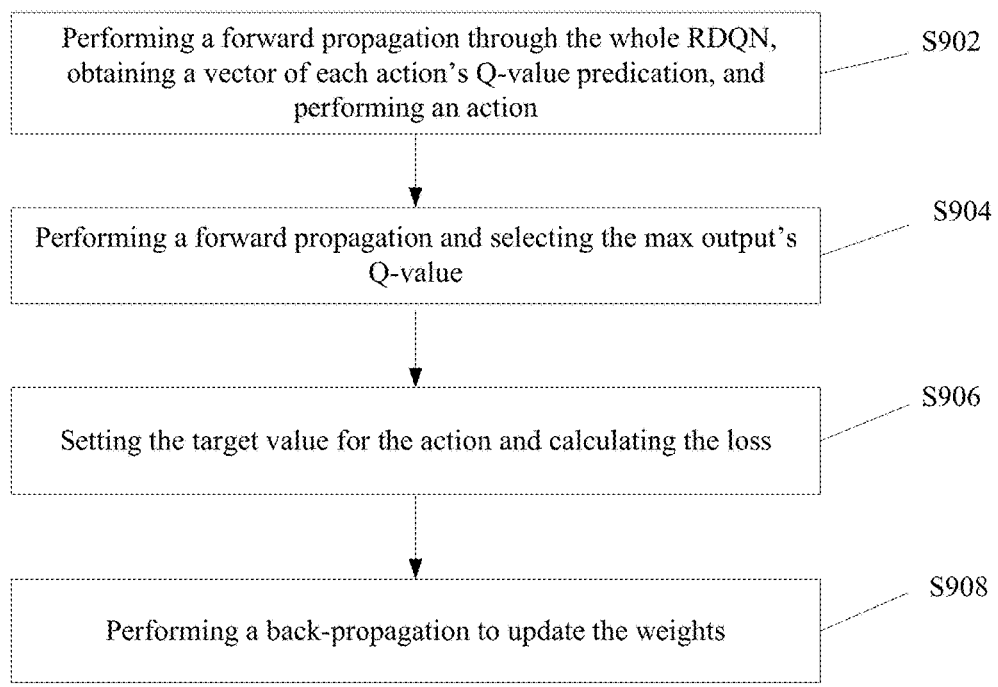
FIG. 9 illustrates an exemplary method for training Q-network consistent with disclosed embodiments.

FIG. 9 illustrates an exemplary method for training Q-network consistent with disclosed embodiments. As shown in FIG. 9, training the Q-network may include the following steps:

Step S902: based on the current state $s_t$, performing a forward propagation through the whole RDQN, obtaining a vector of each action's Q-value predication, and performing an action $a_t$;

Step S904: based on the next state $s_{t+1}$, performing a forward propagation and selecting the max output's Q-value as the $\max_{a_{t+1}} Q(s_{t+1}, a_{t+1})$;

Step S906: setting the target value for the action $a_t$ as $r_t + \max_{a_{t+1}} Q(s_{t+1}, a_{t+1})$ and calculating the loss; and Step S908: performing a back-propagation to update the weights.

Returning to FIG. 4, after the desired action to counteract the lateral disturbance of the drone is predicted based on deep gated recurrent Q-networks (DGRQNs), the UAV is driven back to its initial position, such that a self-stabilization is realized (S410).

The disclosed flight self-stabilization system and method may only require visual information, i.e., multiple camera views captured by an on-board monocular camera, to counteract the lateral disturbance. That is, the disclosed flight self-stabilization system and method may only reply on an image or visual sensor. Given an initial reference image, the disclosed flight self-stabilization system and method may be able to gradually learn the optimal control behavior for realizing the self-stabilization in an open environment, based on a state evaluation mechanism integrated with the camera pose estimation. The Deep-Q framework may be able to learn such optimal control behavior based on the long/short term state memory enabled by a Recurrent Neural Network (RNN).

In addition, the disclosed modified Deep-Q framework may replace the input from a Convolutional Neural Network (CNN) with the input extracted from the camera pose estimation module, thereby improving computational efficiency. The design of DGRQNs control engine aims may enable the Drone to stay at the initial pose intelligently without manually spliced conditions. Compared to the traditional Deep Q-Networks, the disclosed system may adopt a camera pose estimation module to extract the drone's pose information, through which the network may be allowed to obtain vision based features instead of through a conventional processing.

The disclosed framework may simplify the whole system and reduce the computation cost, which may meet the system requirements for an onboard processor installed in the low-end Drone's to realize real-time processing. Moreover, the emended DGRQNs may allow the system to have the memory of more frames than traditional Deep Q-Networks, which may advance the optimal of final action decision because the results are not only relevant to current state but also to previous frames.

Those of skill would further appreciate that the various illustrative modules and method steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for vision-based self-stabilization by deep gated recurrent Q-networks (DGRQNs) for unmanned aerial vehicles (UAVs), comprising:
    receiving a plurality of raw images captured by a camera installed on a UAV;
    receiving an initial reference image for stabilization and obtaining an initial camera pose from the initial reference image;
    extracting a fundamental matrix between consecutive images and estimating a current camera pose relative to the initial camera pose, wherein the camera pose includes an orientation and a location of the camera;
    based on the estimated current camera pose, predicting an action to counteract a lateral disturbance of the UAV based on the DGRQNs, comprising:
        encoding the estimated camera pose into a feature vector;
        processing the feature vector by deep neuron networks (DNNs);
        processing the feature vector by deep gated recurrent neural networks (DGRNs); and
        processing the feature vector by Q-learning to obtain a difference between the estimated current camera pose and the initial camera pose; and
    based on the predicted action to counteract the lateral disturbance of the UAV, driving the UAV back to the initial camera pose.

2. The method for vision-based self-stabilization by DGRQNs for UAVs according to claim 1, wherein extracting a fundamental matrix between consecutive images and estimating a current camera pose relative to the initial camera pose further includes:
    extracting the fundamental matrix and estimating the current camera pose relative to the initial camera pose from more than two consecutive images, comprising:
        for each pair of consecutive images, finding a set of point correspondences using point trackers;
        estimating a relative camera pose of a current image received at a current timestamp, wherein the relative camera pose of the current view includes a camera orientation and location of the current image with respect to a previous image received at a previous timestamp;
        transforming the relative camera pose of the current image into a coordinate system of the initial reference image of the sequence;
        storing the current image attributes including the camera pose and image points;
        storing inlier matches between the previous image and the current image;
        finding the point tracks across all the received images, given the initial reference image;
        applying triangulation with multiple views to compute initial 3-D locations corresponding to the point tracks;
        applying a bundle adjustment to refine the camera pose and 3-D points simultaneously; and
        given all the received images, deriving a rotation matrix R and a translation matrix T relative to the initial reference image by matrix multiplications, wherein the rotation matrix R and translation matrix T at a timestamp t is stored as $H_t=$ $$H_t = \begin{bmatrix} R & T \\ 0 & 1 \end{bmatrix}.$$

3. The method for vision-based self-stabilization by DGRQNs for UAVs according to claim 1, wherein extracting a fundamental matrix between consecutive images and estimating a current camera pose relative to the initial camera pose further includes:
    extracting the fundamental matrix between two consecutive images and estimating the current camera pose relative to the initial camera pose from two consecutive images, wherein the fundamental matrix F is calculated as $F=K_2^{-T}[T]_x R K_1^{-1}$, where $[T]_x$ denotes a skew symmetric matrix and expressed as $$[T]_X = \begin{bmatrix} 0 & -t_3 & t_2 \\ t_3 & 0 & -t_1 \\ -t_2 & t_1 & 0 \end{bmatrix},$$

$K_1$ and $K_2$ respectively camera matrices for a first image and a second image of the two consecutive images, R denotes a rotation matrix, and T denotes a translation matrix; and
    the current camera pose is calculated as $R_1=UWV^T$, $R_2=UW^T V^T$, $T_1=U_3$, $T_2=-U_3$, where $$W = \begin{bmatrix} 0 & -1 & 0 \\ 1 & 0 & 0 \\ 0 & 0 & 1 \end{bmatrix},$$

$E=[T]_x R=U\Sigma V^T$, E denotes an essential matrix, $R_1$ is valid when $\det(R_1)=1$, $R_2$ is valid when $\det(R_2)=1$, $T_1$ is valid when z value of a 3D point is positive, and $T_2$ is valid when z value of a 3D point is positive, and the rotation matrix R and translation matrix T at a timestamp t is stored as $$H_t = \begin{bmatrix} R & T \\ 0 & 1 \end{bmatrix}.$$

4. The method for vision-based self-stabilization by DGRQNs for UAVs according to claim 1, wherein encoding the estimated camera pose into a feature vector further includes:

encoding the estimated camera pose $H_t$ into a length of 6 feature vector v ($\theta_{roll}$, $\theta_{pitch}$, $\theta_{yaw}$, $T_x$, $T_y$, $T_z$), wherein $$H_t = \begin{bmatrix} h_{11} & h_{12} & h_{13} & h_{14} \\ h_{21} & h_{22} & h_{23} & h_{24} \\ h_{31} & h_{32} & h_{33} & h_{34} \\ 0 & 0 & 0 & 1 \end{bmatrix},$$

where $\theta_{roll}$ denotes a roll angle of orientation, and $\theta_{roll}$=a tan 2($h_{32}$,$h_{33}$); $\theta_{pitch}$ denotes a pitch angle of orientation, and $\theta_{pitch}$=a tan 2 ($-h_{31}$, $\sqrt{h_{32}^2+h_{33}^2}$); $\theta_{ywa}$ denotes a yaw angle of orientation, and $\theta_{yaw}$=a tan 2($h_{21}$ $h_{11}$); $T_x$ denotes translation on x axis, and $T_x$=$h_{14}$; $T_y$ denotes translation on y axis, and $T_y$=$h_{24}$; and $T_z$ denotes translation on z axis, and $T_z$=$h_{34}$.

5. The method for vision-based self-stabilization by DGRQNs for UAVs according to claim 4, wherein the DGRNs include a plurality of gated recurrent units (GRUs), processing the feature vector by deep gated recurrent neural networks (DGRNs) further includes:

performing the following computations in a gated recurrent unit (GRU), $z_t = \sigma(W_z \cdot [h_{t-1}, x_t])$ $r_t = \sigma(W_r \cdot [h_{t-1}, x_t])$ $\tilde{h}_t = \tan h(W \cdot [h_{t-1} * r_t, x_t])$ $h_t = (1-z_t) * h_{t-1} + x_t * \tilde{h}_t$, where $h_t$ denotes an output of the GRU, and $h_t$ is fed into a next RNN layer and a next GRU, $h_{t-1}$ denotes an output of a previous GRU.

6. The method for vision-based self-stabilization by DGRQNs for UAVs according to claim 1, wherein processing the feature vector by Q-learning to obtain a difference between the estimated current camera pose and the initial camera pose further includes:

based on a next state's Q-value, calculating a current state Q-value by $Q(s_t,a_t) = r + \max_{a_{t+1}} Q(s_{t+1}, a_{t+1})$, where r denotes an instance reward at current state, and $r=-\|H_t-I\|_{Frobenius\ norm}=\sqrt{\Sigma_{i,j}(H_t-I)_{i,j}^2}$, I denotes a 4×4 identity matrix, and a value of r denote the difference between the estimated current camera pose and the initial camera pose.

7. The method for vision-based self-stabilization by DGRQNs for UAVs according to claim 1, further including:

training the Q-networks, wherein training the Q-networks comprises:

based on the current state $s_t$, performing a forward propagation through the whole RDQN, obtaining a vector of each action's Q-value predication, and performing an action $a_t$;

based on the next state $s_{t+1}$, performing a forward propagation and selecting a max output's Q-value as the $\max_{a_{t+1}} Q(s_{t+1},a_{t+1})$;

setting a target value for the action $a_t$ as $r_t + \max_{a_{t+1}} Q(s_{t+1},a_{t+1})$ and calculating a loss; and performing a back-propagation to update weights, wherein a squared error loss function $$L = \frac{1}{2}[\underbrace{(r + \max_{a_{t+1}} Q(s_{t+1}, a_{t+1}))}_{target} - \underbrace{Q(s_t, a_t)}_{predication}]^2$$

is adopted in training the Q-networks.

8. A non-transitory computer-readable medium having computer program for, when being executed by a processor, performing a method for vision-based self-stabilization by deep gated recurrent Q-networks (DGRQNs) for unmanned aerial vehicles (UAVs), the method comprising:

receiving a plurality of raw images captured by a camera installed on the UAV;

receiving an initial reference image for stabilization and obtaining an initial camera pose from the initial reference image;

extracting a fundamental matrix between consecutive images and estimating a current camera pose relative to the initial camera pose, wherein the camera pose includes an orientation and a location of the camera;

based on the estimated current camera pose, predicting an action to counteract a lateral disturbance of the UAV based on the DGRQNs, comprising:

encoding the estimated camera pose into a feature vector;

processing the feature vector by deep neuron networks (DNNs);

processing the feature vector by deep gated recurrent neural networks (DGRNs); and processing the feature vector by Q-learning to obtain a difference between the estimated current camera pose and the initial camera pose; and based on the predicted action to counteract the lateral disturbance of the UAV, driving the UAV back to the initial camera pose.

9. The non-transitory computer-readable medium according to claim 8, wherein extracting a fundamental matrix between consecutive images and estimating a current camera pose relative to the initial camera pose further includes:

extracting the fundamental matrix and estimating the current camera pose relative to the initial camera pose from more than two consecutive images, comprising:

for each pair of consecutive images, finding a set of point correspondences using point trackers;

estimating a relative camera pose of a current image received at a current timestamp, wherein the relative camera pose of the current view includes a camera orientation and location of the current image with respect to a previous image received at a previous timestamp;

transforming the relative camera pose of the current image into a coordinate system of the initial reference image of the sequence;

storing the current image attributes including the camera pose and image points;

storing inlier matches between the previous image and the current image;

finding the point tracks across all the received images, given the initial reference image;

applying triangulation with multiple views to compute initial 3-D locations corresponding to the point tracks;

applying a bundle adjustment to refine the camera pose and 3-D points simultaneously; and given all the received images, deriving a rotation matrix R and a translation matrix T relative to the initial reference image by matrix multiplications, wherein the rotation matrix R and translation matrix T at a timestamp t is stored as $H_t=$ $$H_t = \begin{bmatrix} R & T \\ 0 & 1 \end{bmatrix}.$$

10. The non-transitory computer-readable medium according to claim 8, wherein extracting a fundamental matrix between consecutive images and estimating a current camera pose relative to the initial camera pose further includes:
  extracting the fundamental matrix between two consecutive images and estimating the current camera pose relative to the initial camera pose from two consecutive images, wherein the fundamental matrix F is calculated as $F=K_2^{-T}[T]_x R K_1^{-1}$, where $[T]_x$ denotes a skew symmetric matrix and expressed as $$[T]_x = \begin{bmatrix} 0 & -t_3 & t_2 \\ t_3 & 0 & -t_1 \\ -t_2 & t_1 & 0 \end{bmatrix},$$

$K_1$ and $K_2$ respectively camera matrices for a first image and a second image of the two consecutive images, R denotes a rotation matrix, and T denotes a translation matrix; and
  the current camera pose is calculated as $R_1=UWV^T$, $R_2=UW^TV^T$, $T_1=U_3$, $T_2=-U_3$, where $$W = \begin{bmatrix} 0 & -1 & 0 \\ 1 & 0 & 0 \\ 0 & 0 & 1 \end{bmatrix},$$

$E=[T]_x R=U\Sigma V^T$, E denotes an essential matrix, $R_1$ is valid when $\det(R_1)=1$, $R_2$ is valid when $\det(R_2)=1$, $T_1$ is valid when z value of a 3D point is positive, and $T_2$ is valid when z value of a 3D point is positive, and the rotation matrix R and translation matrix T at a timestamp t is stored as $$H_t = \begin{bmatrix} R & T \\ 0 & 1 \end{bmatrix}.$$

11. The non-transitory computer-readable medium according to claim 8, wherein:
  encoding the estimated camera pose into a feature vector further includes:
    encoding the estimated camera pose $H_t$ into a length of 6 feature vector v ($\theta_{roll}$, $\theta_{pitch}$, $\theta_{yaw}$, $T_x$, $T_y$, $T_z$), wherein $$H_t = \begin{bmatrix} h_{11} & h_{12} & h_{13} & h_{14} \\ h_{21} & h_{22} & h_{23} & h_{24} \\ h_{31} & h_{32} & h_{33} & h_{34} \\ 0 & 0 & 0 & 1 \end{bmatrix},$$

where $\theta_{roll}$ denotes a roll angle of orientation, and $\theta_{roll}=$a tan $2(h_{32}, h_{33})$; $\theta_{pitch}$ denotes a pitch angle of orientation, and $\theta_{pitch}=$a tan 2 $(-h_{31}, \sqrt{h_{32}^2+h_{33}^2})$; $\theta_{ywa}$ denotes a yaw angle of orientation, and $\theta_{yaw}=$a tan $2(h_{21}, h_{11})$; $T_x$ denotes translation on x axis, and $T_x=h_{14}$; $T_y$ denotes translation on y axis, and $T_y=h_{24}$; and $T_z$ denotes translation on z axis, and $T_z=h_{34}$;
  the DGRNs include a plurality of gated recurrent units (GRUs), processing the feature vector by deep gated recurrent neural networks (DGRNs) further includes:
    performing the following computations in a gated recurrent unit (GRU), $$z_t = \sigma(W_z \cdot [h_{t-1}, x_t])$$

$$r_t = \sigma(W_r \cdot [h_{t-1}, x_t])$$

$$\tilde{h}_t = \tan h(W \cdot [h_{t-1} * r_t, x_t])$$

$$h_t = (1-z_t) * h_{t-1} + x_t * \tilde{h}_t,$$

where $h_t$ denotes an output of the GRU, and $h_t$ is fed into a next RNN layer and a next GRU, $h_{t-1}$ denotes an output of a previous GRU; and
  processing the feature vector by Q-learning to obtain a difference between the estimated current camera pose and the initial camera pose further includes:
    based on a next state's Q-value, calculating a current state Q-value by $Q(s_t,a_t)=r+\max_{a_{t+1}} Q(s_{t+1},a_{t+1})$, where r denotes an instance reward at current state, and $r=-\|H_t-I\|_{Frobenius\ norm}=-\sqrt{\Sigma_{i,j}(H_t-I)_{i,j}^2}$, I denotes a 4×4 identity matrix, and a value of r denote the difference between the estimated current camera pose and the initial camera pose.

12. The non-transitory computer-readable medium according to claim 8, further including:
  training the Q-networks, wherein training the Q-networks comprises:
    based on the current state $s_t$, performing a forward propagation through the whole RDQN, obtaining a vector of each action's Q-value predication, and performing an action $a_t$;
    based on the next state $s_{t+1}$, performing a forward propagation and selecting a max output's Q-value as the $\max_{a_{t+1}} Q(s_{t+1}, a_{t+1})$;
    setting a target value for the action $a_t$ as $r_t+\max_{a_{t+1}} Q(s_{t+1}, a_{t+1})$ and calculating a loss; and
    performing a back-propagation to update weights,
  wherein a squared error loss function $$L = \frac{1}{2}[\underbrace{(r + \max_{a_{t+1}} Q(s_{t+1}, a_{t+1}))}_{target} - \underbrace{Q(s_t, a_t)}_{predication}]^2$$

is adopted in training the Q-networks.

13. A system for vision-based self-stabilization by deep gated recurrent Q-networks (DGRQNs) for unmanned aerial vehicles (UAVs), comprising:
  a memory; and
  a processor coupled to the memory, wherein the processor is configured to:
  receive a plurality of raw images captured by a camera installed on the UAV, extract a fundamental matrix between consecutive images, and estimate a current camera pose relative to an initial camera pose, wherein the camera pose includes an orientation and a location of the camera; and
  based on the estimated current camera pose, predict an action to counteract a lateral disturbance of the UAV based on DGRQNs, comprising:
    encode the estimated camera pose into a feature vector;

process the feature vector by deep neuron networks (DNNs);
process the feature vector by deep gated recurrent neural networks (DGRNs); and
process the feature vector by Q-learning to obtain a difference between the estimated current camera pose and the initial camera pose; and
based on the predicted action to counteract the lateral disturbance of the UAV, drive the UAV back to the initial camera pose.

14. The system for vision-based self-stabilization by DGRQNs for UAVs according to claim 13, wherein the processor is further configured to:
  initialize the initial reference image for stabilization and obtain an initial camera pose from the initial reference image; and
  extract the fundamental matrix and estimate the current camera pose relative to the initial camera pose from more than two consecutive images through:
    for each pair of consecutive images, finding a set of point correspondences using point trackers;
    estimating a relative camera pose of a current image received at a current timestamp, wherein the relative camera pose of the current view includes a camera orientation and location of the current image with respect to a previous image received at a previous timestamp;
    transforming the relative camera pose of the current image into a coordinate system of the initial reference image of the sequence;
    storing the current image attributes including the camera pose and image points;
    storing inlier matches between the previous image and the current image;
    find the point tracks across all the received images, given the initial reference image;
    applying triangulation with multiple views to compute initial 3-D locations corresponding to the point tracks;
    applying a bundle adjustment to refine the camera pose and 3-D points simultaneously; and
    given all the received images, deriving a rotation matrix R and a translation matrix T relative to the initial reference image by matrix multiplications, wherein the rotation matrix R and translation matrix T at a timestamp t is stored as $H_t=$ $$H_t = \begin{bmatrix} R & T \\ 0 & 1 \end{bmatrix}.$$

15. The system for vision-based self-stabilization by DGRQNs for UAVs according to claim 13, wherein the processor is further configured to:
  initialize the initial reference image for stabilization and obtain an initial camera pose from the initial reference image; and
  extract the fundamental matrix between consecutive images and estimate the current camera pose relative to the initial camera pose from two consecutive images, wherein the fundamental matrix F is calculated as $F=K_2^{-T}[T]_x R K_1^{-1}$, where $[T]_x$ denotes a skew symmetric matrix and expressed as $$[T]_x = \begin{bmatrix} 0 & -t_3 & t_2 \\ t_3 & 0 & -t_1 \\ -t_2 & t_1 & 0 \end{bmatrix},$$

$K_1$ and $K_2$ respectively camera matrices for a first image and a second image of the two consecutive images, R denotes a rotation matrix, and T denotes a translation matrix; and
the current camera pose is calculated as $R_1=UWV^T$, $R_2=UW^T V^T$, $T_1=U_3$, $T_2=-U_3$, where $$W = \begin{bmatrix} 0 & -1 & 0 \\ 1 & 0 & 0 \\ 0 & 0 & 1 \end{bmatrix},$$

$E=[T]_x R=U\Sigma V^T$, E denotes an essential matrix, $R_1$ is valid when $\det(R_1)=1$, $R_2$ is valid when $\det(R_2)=1$, $T_1$ is valid when z value of a 3D point is positive, and $T_2$ is valid when z value of a 3D point is positive, and the rotation matrix R and translation matrix T at a timestamp t is stored as $$H_t = \begin{bmatrix} R & T \\ 0 & 1 \end{bmatrix}.$$

16. The system for vision-based self-stabilization by DGRQNs for UAVs according to claim 14, wherein the processor is further configured to: encode the estimated camera pose into the feature vector through:
  encoding the estimated camera pose $H_t$ into a length of 6 feature vector v ($\theta_{roll}$, $\theta_{pitch}$, $\theta_{yaw}$, $T_x$, $T_y$, $T_z$), wherein $$H_t = \begin{bmatrix} h_{11} & h_{12} & h_{13} & h_{14} \\ h_{21} & h_{22} & h_{23} & h_{24} \\ h_{31} & h_{32} & h_{33} & h_{34} \\ 0 & 0 & 0 & 1 \end{bmatrix},$$

where $\theta_{roll}$ denotes a roll angle of orientation, and $\theta_{roll}$=a tan 2($h_{32}$,$h_{33}$); $\theta_{pitch}$ denotes a pitch angle of orientation, and $\theta_{pitch}$=a tan 2 ($-h_{31}$, $\sqrt{h_{32}^2+h_{33}^2}$); $\theta_{ywa}$ denotes a yaw angle of orientation, and $\theta_{yaw}$=a tan 2($h_{21}$ $h_{11}$); $T_x$ denotes translation on x axis, and $T_x=h_{14}$; $T_y$ denotes translation on y axis, and $T_y=h_{24}$; and $T_z$ denotes translation on z axis, and $T_z=h_{34}$;
the processor is further configured to process the feature vector by DGRNs through:
  performing the following computations in a gated recurrent unit (GRU), $z_t=\sigma(W_z \cdot [h_{t-1},x_t])$ $r_t=\sigma(W_r \cdot [h_{t-1},x_t])$ $\tilde{h}_t=\tan h(W \cdot [h_{t-1}*r_t,x_t])$ $h_t=(1-z_t)*h_{t-1}+x_t*\tilde{h}_t$ where $h_t$ denotes an output of the GRU, and $h_t$ is fed into a next RNN layer and a next GRU, $h_{t-1}$ denotes an output of a previous GRU; and
process the feature vector by Q-learning to obtain the difference between the estimated current camera pose and the initial camera pose through:

based on a next state's Q-value, calculating a current state Q-value
by $Q(s_t, a_t) = r + \max_{a_{t+1}} Q(s_{t+1}, a_{t+1})$, where r denotes an instance reward at current state, and $r = -\|H_t - I\|_{Frobenius\ norm} = \sqrt{\Sigma_{i,j}(H_t - I)_{i,j}^2}$, I denotes a 4×4 identity matrix, and a value of r denote the difference between the estimated current camera pose and the initial camera pose.

17. The system for vision-based self-stabilization by DGRQNs for UAVs according to claim 14, wherein the processor is further configured to:

train the Q-networks through:

based on the current state $s_t$, performing a forward propagation through the whole RDQN, obtaining a vector of each action's Q-value predication, and performing an action $a_t$;

based on the next state $s_{t+1}$, performing a forward propagation and selecting a max output's Q-value as the $\max_{a_{t+1}} Q(s_{t+1}, a_{t+1})$;

setting a target value for the action $a_t$ as $r_t + \max_{a_{t+1}} Q(s_{t+1}, a_{t+1})$ and calculating a loss; and performing a back-propagation to update weights, wherein a squared error loss function $$L = \frac{1}{2}\left[\underbrace{(r + m_{a_{t+1}} Q(s_{t+1}, a_{t+1}))}_{target} - \underbrace{Q(s_t, a_t)}_{predication}\right]^2$$

is adopted in training the Q-networks.

* * * * *